C. B. JONES.
COUPLING.
APPLICATION FILED APR. 7, 1917.

1,255,756.

Patented Feb. 5, 1918.
2 SHEETS—SHEET 1.

WITNESSES
W. H. Lybrand
F. Hough

INVENTOR
C. B. Jones
BY Victor J. Evans
ATTORNEY

C. B. JONES.
COUPLING.
APPLICATION FILED APR. 7, 1917.
1,255,756.
Patented Feb. 5, 1918.
2 SHEETS—SHEET 2.
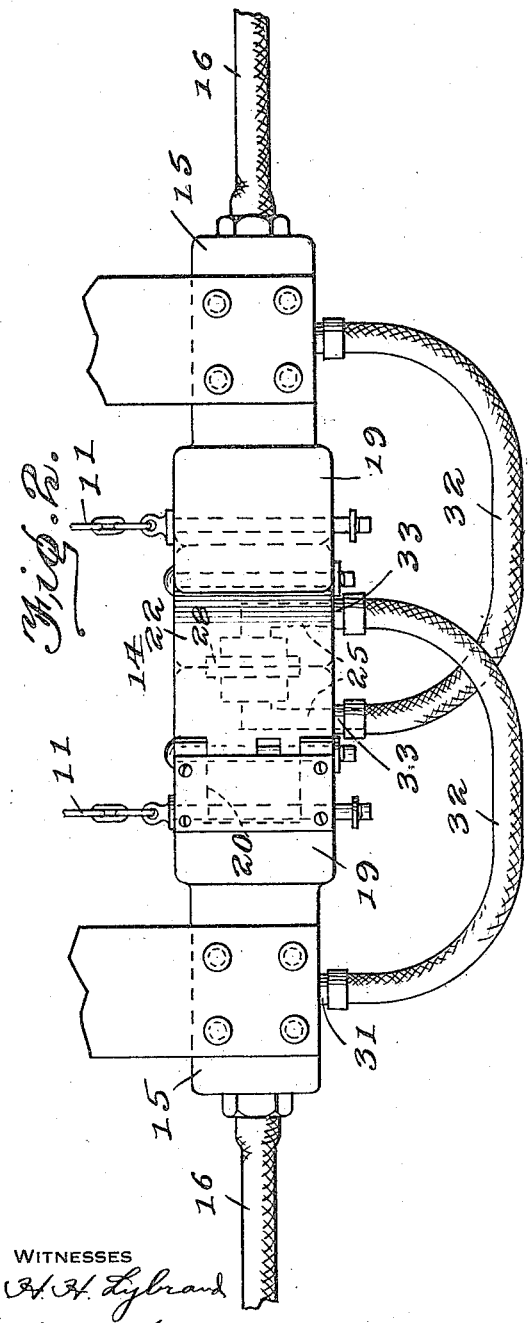
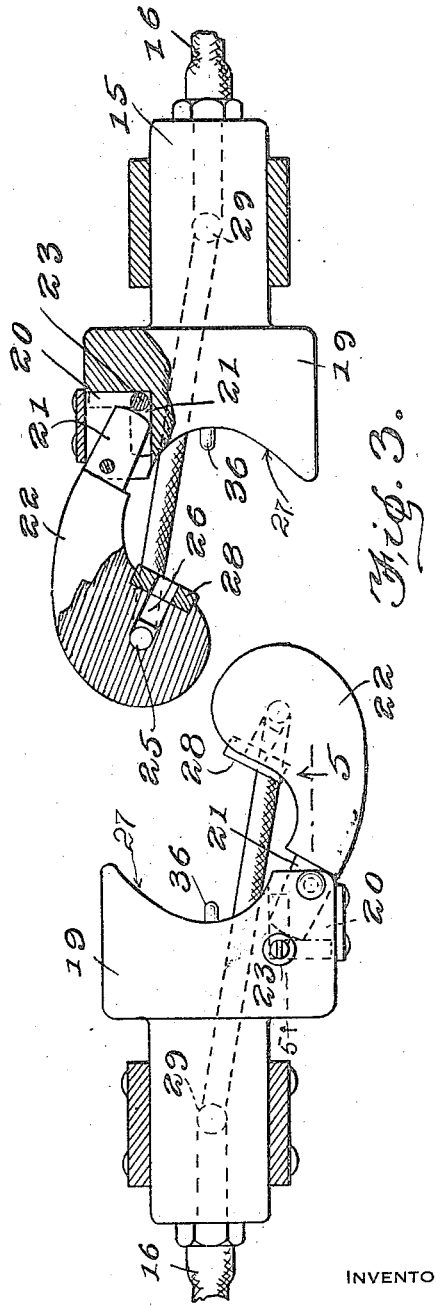
WITNESSES
H. H. Lybrand
F. Hough
INVENTOR
C. B. Jones
BY Victor J. Evans
ATTORNEY

UNITED STATES PATENT OFFICE.

CURRAN B. JONES, OF EVANSVILLE, INDIANA.

COUPLING.

1,255,756.

Specification of Letters Patent.   Patented Feb. 5, 1918.

Application filed April 7, 1917.   Serial No. 160,436.

*To all whom it may concern:*

Be it known that I, CURRAN B. JONES, a citizen of the United States, residing at Evansville, in the county of Vanderburg and State of Indiana, have invented new and useful Improvements in Couplings, of which the following is a specification.

This invention relates to a coupling which is especially adapted for connecting the air pipes upon railroad cars employing pneumatically operated braking mechanism.

The primary object of the invention is to provide couplings for this purpose which are so constructed that as the cars are coupled, the couplings are caused to automatically interengage and connect the air pipes upon the cars to permit the operation of the brakes, and upon the uncoupling of the cars by the usual mechanism provided for this purpose, the couplings will be released from engagement with each other, thus disconnecting the air pipes upon the cars.

Another object of the invention is to provide the couplings with mechanisms which as the couplings interengage is operated by the couplings to permit the air in the train pipe to pass through the connected couplings and upon disengagement of the couplings to prevent the escape of air from the train line pipe through the coupling at the end of the line.

A further object of the invention is to provide the couplings with valves the stems of which extend beyond an end of the couplings bodies and through the air pressure upon the valves engage the knuckles on the couplings when the couplings are connected and hold the gasket in the knuckles in firm contact with each other.

With these and other objects in view, the invention resides in the novel combination and arrangement of parts which will be hereinafter described and particularly pointed out in the claims.

The preferred embodiment of the invention has been illustrated in the accompanying drawings, although no restriction is necessarily made to the precise details of construction therein shown, as changes, alterations, and modifications, within the scope of the claims may be resorted to when desired.

In the drawings:

Fig. 2 is an enlarged view in side elevation of a pair of couplings, showing the same removed from the cars and connected.

Fig. 3 is a top plan view of a pair of said couplings, showing the same disconnected.

Like characters of reference denote corresponding parts throughout the several views in the drawings.

Figure 1:
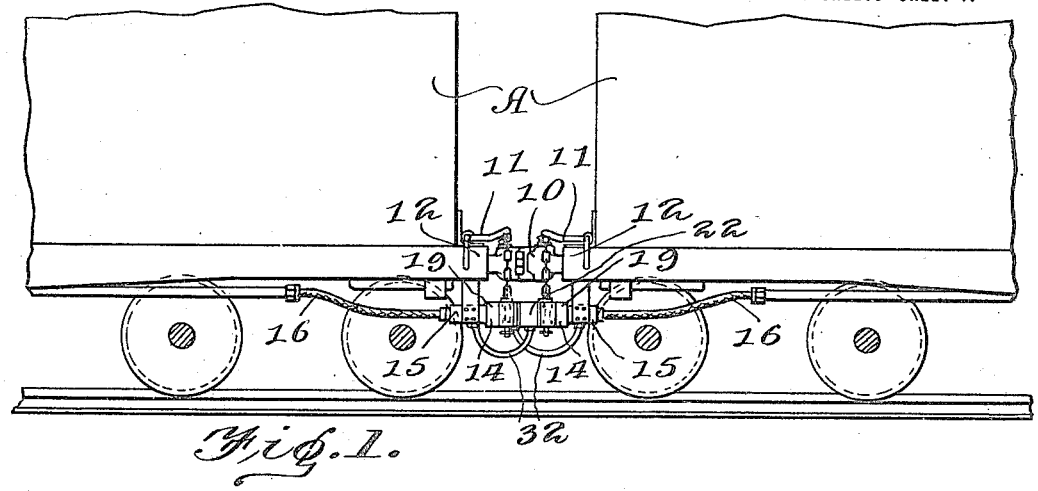
Figure 1 is a view in elevation of a portion of two connected cars showing the improved coupling employed to connect the air pipes thereon.
Figure 4:
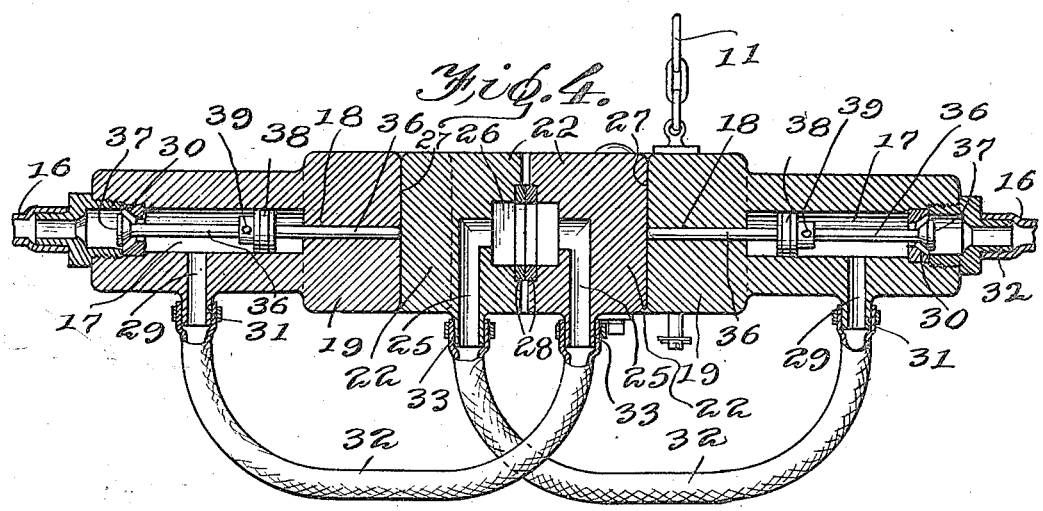
Fig. 4 is a vertical longitudinal section through the coupling.
Figures 5, 6:
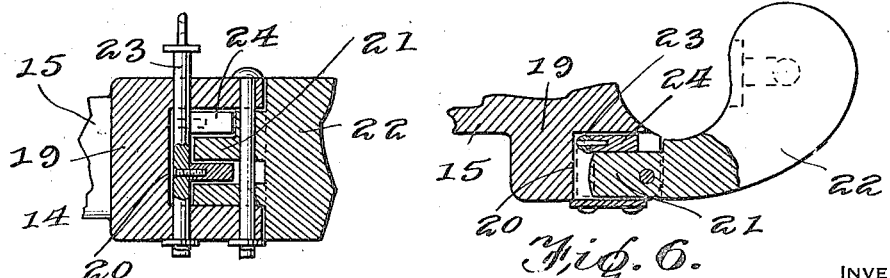
Fig. 5 is a detail sectional view on the line 5—5 of Fig. 3.
Fig. 6 is a detail sectional view through a portion of one of the couplings.

Referring now to the drawings in detail, the letter A designates the meeting ends of two railroad cars which are connected by means of couplers 10 of the usual type, said couplers having connected therewith and with the ends of the car, the usual mechanism 11 through the operation of which the couplers may be disconnected.

Arranged below the couplers 10 and suitably connected with the cross sills 12 at the ends of the cars A are the improved couplings 14, each of which is identical in construction and comprises a shank 15 extending beneath the cross sill 12 for connection with an end of the air pipe 16 on the car bottom. The shank 15 is provided with a longitudinally extending bore 17 providing a valve chamber therein and counter-bored, as at 18, said counter-bore passing through a head 19 formed integral with the forward end of the shank.

The head 19 has formed in one side thereof a recess 20 into which extend extensions 21 on a knuckle 22 pivotally connected with the head and extending beyond the same. A shaft 23 mounted to slide and turn in the head 19 passes through the recess 20 and has formed thereon fingers 24 which when engaged with the extensions 21 on the knuckle serve to hold the same in locked position, and when arranged between the extensions on the knuckle permit the knuckle being swung to unlocked position.

The knuckle 22 has formed therein at its forward end a vertically extending channel 25 opening out at one end through the bottom of the knuckle and at its other end into an elongated and vertically extending recess 26 in the face of the knuckle opposite a concavity 27 in the front face of the head 19, said recess having arranged therein and secured to the knuckle in any suitable manner a compressible gasket 28.

The shank 15 has formed therein a by-pass 29 having communication with the bore 17 between the head 19 and a valve seat 30 adjustably mounted within the bore adjacent the other end of the shank 15, said by-pass opening out upon one side of the shank through a nipple 31 with which is connected one end of the hose 32, the other end of the hose having connection with the nipple 33 at the lower end of the vertically extending channel 25 in the nose of the knuckle 22 said hose establishing communication between the air pipe and knuckle.

A valve stem 36 passes through the counter-bore 18 and has one end thereof extending beyond the wall of the concavity 27 in the head 19, the other end of the stem which passes through an opening in the valve seat 30 has secured thereto a head 37 normally held in engagement with the valve seat 30 by the air pressure in the train pipe. A collar 38 is secured to the stem 36 by a set screw 39 and tightly fits within the bore 17 to prevent the escape of air between the stem 36 and the wall of the counter-bore 18 when the head 37 of the valve is disengaged from the seat 30 by the interlocking of the knuckles on the couplings, thus enabling the air pressure in the pipes 16 to hold the stems of the valves firmly against the knuckles, so that the gaskets carried thereby will be held firmly engaged with each other.

With the couplings mounted upon the ends of the cars as shown, as the cars couple, the knuckles through their engagement with the concaved faces upon the heads 19 are swung to locking position and held in such position by the shafts 23 and fingers thereon, the interengaging of the knuckles unseating the valves 37 from the seats 30 against the air pressure in the train line, so that the air in the train line may pass through the connected couplings.

Upon the operation of the mechanism for releasing the couplers 10, the shafts 23 will also be operated to permit the couplings to swing to unlocked position, so that upon the disengagement of the knuckles from each other, the air pressure will serve to seat the valve 37 against the seats 30 and to prevent the escape of air from the train pipes through the knuckles.

From the foregoing description, taken in connection with the accompanying drawings, it is at once apparent that a coupling device for the purpose set forth has been provided which is simple in construction, and highly efficient for the purpose set forth.

Having thus described the invention, what is claimed as new, is:

1. In a device of the class described, a coupling body having a channel extending longitudinally thereof, a knuckle hingedly connected with said coupling body at one side of and in advance of said channel, said knuckle having a recess in one side thereof communicating with a channel in said knuckle, a gasket within said recess to engage a gasket in a similar recess in a knuckle for engagement therewith, and means for establishing communication between the channel in the coupling body and the channel in the knuckle.

2. In a device of the class described, a coupling body having a valve chamber extending longitudinally thereof, a knuckle pivotally connected with one end of said coupling body and to engage with a similar knuckle for contact therewith, said knuckle having a channel therein opening out into a recess in one side of a knuckle and in communication with the channel in the coupling body and a knuckle operated valve in said valve chamber.

In testimony whereof I affix my signature.

CURRAN B. JONES.

Copies of this patent may be obtained for five cents each, by addressing the "Commissioner of Patents, Washington, D. C."